United States Patent [19]

Larsen et al.

[11] Patent Number: 5,716,559
[45] Date of Patent: Feb. 10, 1998

[54] METHOD OF PRODUCING MONOLITHIC CERAMIC CROSS-FLOW FILTER

[75] Inventors: David A. Larsen, Clifton Park; David P. Bacchi, Schenectady; Timothy F. Connors, Watervliet; Edwin L. Collins, III, Albany, all of N.Y.

[73] Assignee: Blasch Precision Ceramics, Inc., Albany, N.Y.

[21] Appl. No.: 664,381

[22] Filed: Jun. 14, 1996

[51] Int. Cl.$^6$ .................................................. C04B 33/28
[52] U.S. Cl. ...................... 264/28; 264/628; 264/629; 264/635; 55/523
[58] Field of Search ........................... 264/28, 317, 635, 264/629, 628

[56] References Cited

U.S. PATENT DOCUMENTS

| | | | |
|---|---|---|---|
| 3,437,723 | 4/1969 | Habermann | 264/629 |
| 3,512,571 | 5/1970 | Phelps | 164/37 |
| 4,246,209 | 1/1981 | Johannson | 264/28 |
| 4,343,631 | 8/1982 | Giberti | 55/302 |
| 4,417,908 | 11/1983 | Pitcher | 55/523 |
| 4,975,225 | 12/1990 | Vivaldi | 264/28 |
| 5,009,781 | 4/1991 | Goldsmith | 210/247 |

*Primary Examiner*—James Derrington
*Attorney, Agent, or Firm*—Schmeiser, Olsen & Watts

[57] ABSTRACT

Ceramic filter of various configuration have been used to filter particulates from hot gases exhausted from coal-fired systems. Prior ceramic cross-flow filters have been favored over other types, but those previously horn have been assemblies of parts somehow fastened together and consequently subject often to distortion or delamination on exposure hot gas in normal use. The present new monolithic, seamless, cross-flow ceramic filters, being of one-piece construction, are not prone to such failure. Further, these new products are made by novel casting process which involves the key steps of demolding the ceramic filter green body so that none of the fragile inner walls of the filter is cracked or broken.

5 Claims, 1 Drawing Sheet

METHOD OF PRODUCING MONOLITHIC CERAMIC CROSS-FLOW FILTER

The present invention was made under DOE Small Business Innovation Research grant No. DE-FG 02-94ER81718 and relates to monolithic ceramic cross-flow filters and method of production. The Federal Government (U.S. Department of Energy) has rights pursuant to this contract.

FIELD OF THE INVENTION

The present invention relates generally to the art of cleaning flowing gases and is more particularly concerned with a novel cross-flow ceramic filter which is seamless and monolithic, and with a new method of producing that unique article.

BACKGROUND OF THE INVENTION

Ceramic hot gas particulate filters known heretofore were designed to filter particulates from the hot gas exhausted from coal-fired power generation systems. They were of different types, including the most common candle filter which is shaped like a long hollow candle, ceramic membrane "dead end" flow filters that have parallel dirty and clean gas channels, and ceramic cross-flow filters. Ceramic candle filters have proved to be effective, but have a low filter surface area per unit volume, requiring more space per hot gas filter system. The ceramic cross-flow filter has the benefit of higher surface area per unit volume as compared to candle filters.

In a true ceramic cross-flow filter design typically having overall outside dimensions of about 12"×12"×4" multiple rows of channels are apparent, each row being perpendicular to both the row beneath it and above it. Both ends of all of each short channel (4 inches) are open to receive particle-laden "dirty" hot gas. One end of each long (12 inch) channel is closed (dead-ended), while the other end is open to exhaust filtered "clean" gas. Filtration occurs when particle-laden "dirty" gas flows through the "roof and floor" of the porous ceramic walls shared by the "dirty" gas and "clean" gas channels. Further, the filtered gas is exhausted from the filter through the open end of each "clean" gas channel.

Prior ceramic cross-flow filters have either been multi component assemblies somehow fastened together or have not been a true "cross-flow" design because the dirty gas and clean gas channels run parallel to each other rather than perpendicular (also known as a ceramic membrane "dead-end" filter). These prior filters were constructed or formed by one of following methods: 1) orienting consecutive layers of thin, porous, ribbed ceramic plates such that they formed rows of gas flow channels, each row being perpendicular in direction compared to the previous and next row, or 2) extrusion of a porous, ceramic, square prism shape with channels all the way through in a single direction (honeycomb-like), then blocking off alternate channels on opposite ends, such that rows of parallel gas flow channels are formed (thus the term "dead-end" filter).

The advantages afforded by cross-flow filters for gas cleaning particulate removal have long been recognized by those skilled in the art. It has also long been well known that such filters are subject to significant problems in use because of deformation and delamination. Attempts heretofore to overcome or avoid those difficulties being unsuccessful, the condition has persisted for over a decade and therefore precluded the product from becoming commercially viable.

SUMMARY OF THE INVENTION

The present invention, which enables elimination of the disadvantages of the best of the prior cross-flow ceramic filters, was made by turning to a seamless, monolithic structure and then finding a way in which to produce an unbroken filter structure every time. Very importantly that involved completely eliminating the tendency for breakage of the ceramic green body to occur during the demolding operation, particularly in the fragile, semipermeable, shared wall portions of the structure. A key feature of the novel process of this invention which we found to answer this critical need is the timing of the step of withdrawing the mold plate cores from the green body. Thus, we discovered that by making that separation while at least the interface or surface portions of the semipermeable wall sections are hard frozen, the integrity of all those inner walls throughout the monolithic body is preserved.

Described in brief, the method of this invention comprises the steps of providing a box-like mold having a first array of plate cores and a second array of plate cores interleaved perpendicularly to the first plate cores array to complete a negative image of the desired cross-flow filter, then filling the mold with a slurry containing a freeze-sensitive inorganic colloidal sol and inorganic particles, and freezing the slurry fill in situ in the mold. Thereafter, while maintaining the resulting green body in hard frozen condition in the mold, both plate core arrays are withdrawn leaving closely-spaced, uniform height, but separate isolated gas channels in place of the plate cores in the green body, and finally removing the green body from the mold. In practice the operator has the choice of pouring or casting the slurry in the mold or pressure-injecting it and in preferred practice may vibrate the mold as it is being filled to minimize air bubbles and voids in the slurry fill. Also, it may be preferred to warm, completely thaw and air dry the green body after removing it from the mold preparatory to a final firing step.

Likewise briefly described, the new ceramic monolithic cross-flow filter of this invention is a one-piece body having a first array of channels extending in mutually parallel fashion longitudinally through the body and open at both ends to receive dirty particle-laden gas to be cleaned; and a second array of parallel rows of channels open at one end and closed at the other end interleaved with the channels of the first array; a common semipermeable wall between each first array channel and adjacent second array channel being shared and serving as a filter for separation of particles from dirty particle-laden gas as it is traveled into first array channels and through the semipermeable shared wall into the second array channels.

BRIEF DESCRIPTION OF THE DRAWINGS

Novel features of the new ceramic filters of this invention described below are illustrated in the drawings accompanying and forming a part of the specification, in which.

DETAILED DESCRIPTION AND PREFERRED EMBODIMENTS

Figure 1:
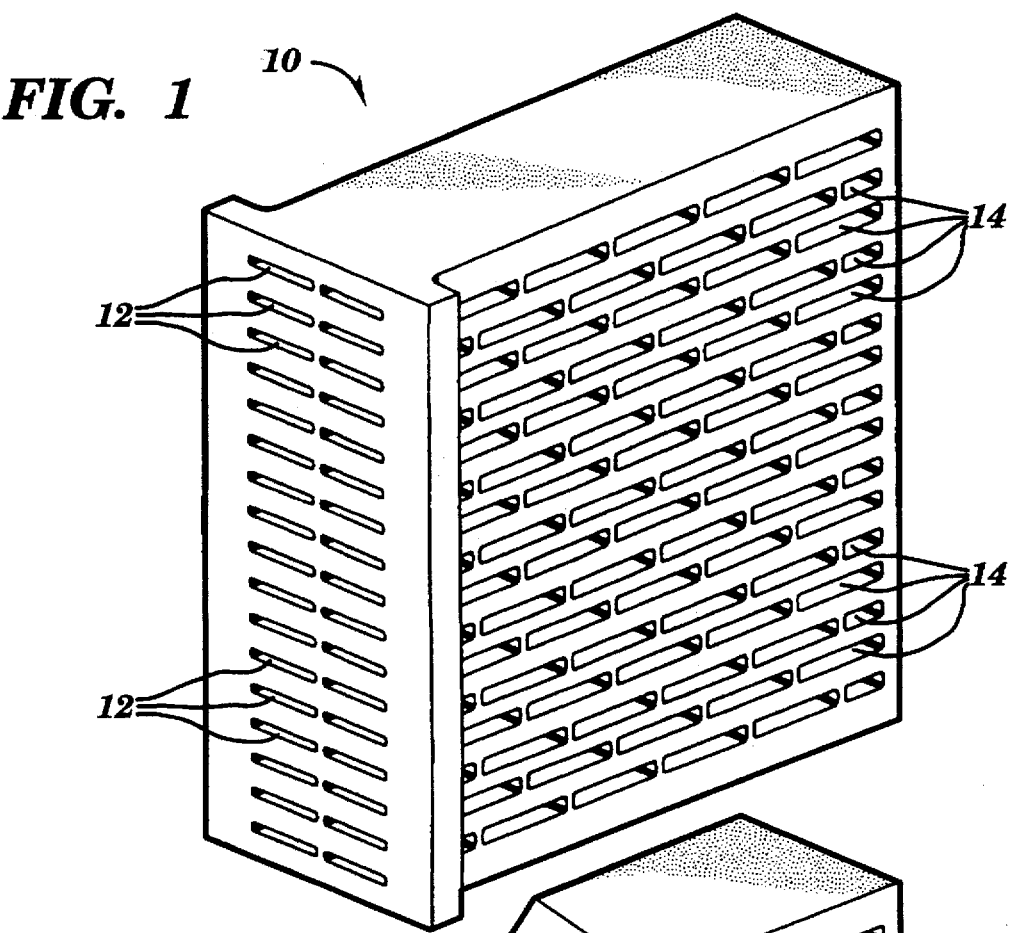
FIG. 1 is a view in perspective of a preferred form of the present invention article.
Figure 2:
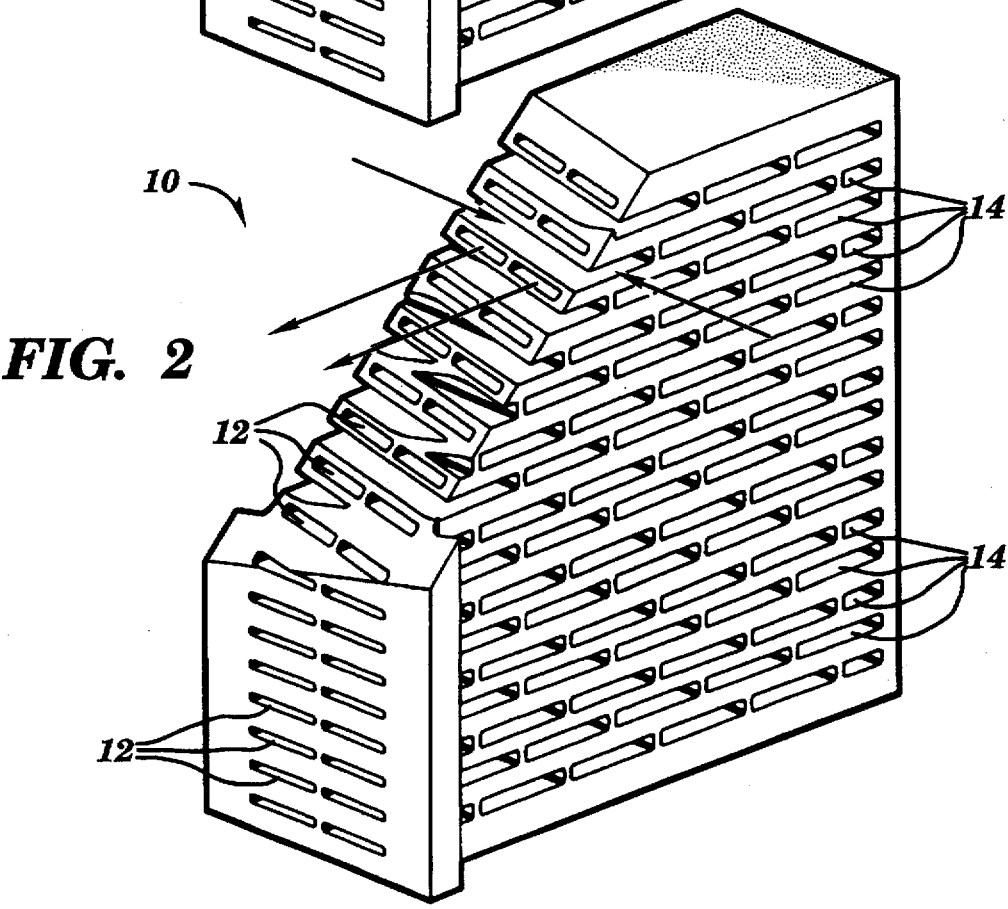
FIG. 2 is a view like that of FIG. 1 with a portion of the monolithic filter broken away for clarity.

In accordance with this invention, slurries containing inorganic colloidal sol and inorganic ceramic particles are injected or cast into a cross-flow filter mold (not shown), frozen, and then demolded to form a full scale, truly monolithic (one-piece), ceramic, cross-flow filter 10 that has no seam and does not deform or delaminate during drying or firing. Ceramic cross-flow filter 10 has clean gas channels 12 and dirty gas channels 14 that are perpendicular thereto. This forming method avoids the above mentioned prior problems and is applicable to the full range of channel dimensions of ceramic gas filters.

The various inorganic particles that can be used for this invention include alumina, mullite, cordierite, silicon carbide, silica, silicon nitride, aluminum nitride, magnesia, alumina-magnesia spinel, aluminum titanate, zircon, zirconia, and clays. The invention process is broadly applicable to suspensions of inorganic particles in general including other metal compounds. Mixtures may be used if desired. Optionally, fillers such as organics and fibers may be added to provide additional porosity if so desired.

The particle size of the inorganic ceramic particles is not critical, although for best results, the largest particles should be smaller in diameter than the narrowest wall thickness of the cross-flow filter to be formed.

The inorganic sol of preference is silica sol due to it's ready availability, but any freeze-sensitive inorganic sol may be used for this invention. A freeze-sensitive sol is one which, when frozen, will break down and no longer exist as a sol or colloidal suspension when thawed. Freeze-sensitive colloidal ceramic sols include colloidal ceramic sols such as those disclosed in the Smith-Johannsen U.S. Pat. Nos. 3,177,161 and 3,512,571 to Phelps; 3,816,572 to Roelofs and 3,885,005 to Downing et al. Additionally, any freeze-sensitive inorganic sol produced "in-situ" (by somehow mixing, during the process, the required ingredients of an inorganic sol to yield a freeze-sensitive colloidal solution; these ingredients are submicron ceramic particulates, water, and an appropriate ionic additive to suspend these fine particulates) may be used for this invention.

In this method, the ceramic particulates of choice are mixed together with the freeze-sensitive inorganic sol of choice to yield an aqueous suspension or slurry. If any fillers such as organics or fibers are desired to yield the necessary ceramic porosity, they may also be mixed together with the other components at this time. This slurry is then either poured, cast, or pressure-injected into a mold which is the negative image of a ceramic cross-flow filter. Vibration may be used if desired during this casting or injection process to minimize air bubbles and voids in the slurry.

The mold loaded with aqueous slurry is then placed in a freeze environment where the temperature is lower than the freeze point of the inorganic sol (example: below 32° F.). It is then permitted to sufficiently cool until the entire mold has reached a steady-state frozen condition. Once fully frozen, the mold is removed from the freezer and disassembled to enable removal of the frozen monolithic ceramic cross-flow filter. This filter is permitted to thaw and air dry. After thoroughly dried, this filter is fired in a kiln.

The mold must be constructed out of material that is itself resistant to freeze-thaw conditions, and will withstand significant pressures caused by the freezing of an aqueous slurry (which without restriction, undergoes volume expansion during freezing) without deformation. For each of the several cross-flow filter gas channels, an individual "plate core" is used to form the negative image of the channel. These channels/mold plate cores can be virtually any size from a minimum height of 1 or 2 millimeters, with virtually no maximum height. The mold plate cores are removed from the mold during the mold disassembly step and it is absolutely essential in carrying out this step that it be done while the ceramic green body is frozen and the ceramic interface or surface portions of the semipermeable walls encompassing the cores have not begun to thaw.

Those skilled in the art will gain further understanding of this invention from the following illustrative, but not limiting, example of our current best practice.

EXAMPLE

A box-like metal mold was set-up with two removable side walls, each carrying 7.5 mm high×50 and 38 mm wide rectangular (with radiused corners) plate cores extending through the mold interior to the opposed wall; and with one removable end wall, carrying 3 mm high×23 mm wide rectangular (with radiused corners) plate cores extending through the mold interior but without actually making contact the opposed wall. The plate cores were spaced apart from top to bottom of the mold, the cores carried by the end wall being uniformly spaced about 2.5 mm from the cores above and below carried by the side walls. This mold was filled with a slurry so that the mold plate cores interleaved as two arrays define a cross-flow filter channel pattern to be formed in the resulting semipermeable ceramic body.

The slurry was a mixture of alumina, kyanite clay, colloidal silica sol and organic fillers.

With the mold fully charged with the casting slurry as poured and settled into place, the mold was refrigerated to freeze the slurry. The plate cores were thereafter removed from the frozen ceramic casting which was then removed from the mold and visually examined. The thin semipermeable interior walls of the monolithic body were found to be unbroken throughout the structure. The frozen ceramic casting was warmed to thaw and air dried, followed by firing in a laboratory kiln.

We claim:

1. A method of producing a seamless, monolithic, ceramic, cross-flow filter which comprises the steps of providing a mold in a form of a box-like frame having a first core array and a second core array interleaved at 90° to the first core array wherein the first and second core arrays define a negative image of the desired cross-flow filter, filling the mold with a slurry of freeze-sensitive inorganic colloidal sol and inorganic ceramic particles, freezing the slurry fill in the mold, maintaining the resulting frozen ceramic cross-flow filter green body in original solidly frozen state in the mold while withdrawing both core arrays from the green body and then removing the green body from the mold.

2. The method of claim 1 in which the slurry is poured or cast into the mold.

3. The method of claim 1 in which the slurry is pressure-injected into the mold.

4. The method of claim 1 including the step of vibrating the mold as it is filled to minimize air bubbles and voids in the slurry fill.

5. The method of claim 1 including the steps of warming and thawing the green body following the removal of the plate core arrays and finally firing the green body.

* * * * *